(12) United States Patent
Norton et al.

(10) Patent No.: US 9,724,830 B2
(45) Date of Patent: Aug. 8, 2017

(54) MANUAL ROBOTIC TOOL CHANGER WITH ROLLING MEMBERS

(75) Inventors: Daniel Allen Norton, Cary, NC (US); Kenneth L. Potts, Durham, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 2586 days.

(21) Appl. No.: 12/205,216

(22) Filed: Sep. 5, 2008

(65) Prior Publication Data

US 2010/0059943 A1  Mar. 11, 2010

(51) Int. Cl.
*B23B 31/10* (2006.01)
*B23B 31/22* (2006.01)
*B25J 15/04* (2006.01)
*B23B 31/107* (2006.01)

(52) U.S. Cl.
CPC ............ *B25J 15/04* (2013.01); *B23B 31/107* (2013.01); *B23B 31/22* (2013.01); *Y10T 279/1037* (2015.01); *Y10T 279/1041* (2015.01); *Y10T 279/1045* (2015.01); *Y10T 279/1074* (2015.01); *Y10T 279/1091* (2015.01); *Y10T 279/17726* (2015.01)

(58) Field of Classification Search
CPC ......... B23B 31/107; B23B 31/22; B25J 15/04
USPC .............. 279/2.1, 2.11, 2.12, 2.19, 2.23, 69; 403/322.2
See application file for complete search history.

(56) References Cited

U.S. PATENT DOCUMENTS 3,035,788 A * 5/1962 Horberg ...................... 242/597.4
3,225,617 A * 12/1965 Young ............................. 477/43
3,442,541 A * 5/1969 Metz ............................. 403/316
4,432,506 A * 2/1984 Bingaman ................... 242/573.9
4,568,110 A   2/1986 Momberg
4,708,040 A * 11/1987 Erickson ......................... 82/160
4,723,877 A *  2/1988 Erickson ....................... 409/234
4,747,735 A *  5/1988 Erickson et al. ............. 409/234
4,906,123 A *  3/1990 Weskamp et al. ......... 403/322.2
4,981,057 A    1/1991 von Haas et al.
5,035,557 A *  7/1991 Kohlbauer et al. ........... 409/233
5,054,344 A * 10/1991 Erickson et al. ............... 82/160
5,169,270 A * 12/1992 Erickson ....................... 411/306
5,211,501 A    5/1993 Nakamura et al.
(Continued)

FOREIGN PATENT DOCUMENTS

DE  3706946 A1  9/1988
DE  4113449 C1  7/1992
(Continued)

*Primary Examiner* — Christopher Besler
*Assistant Examiner* — Bayan Salone
(74) *Attorney, Agent, or Firm* — Coats & Bennett, PLLC

(57) ABSTRACT

A manually actuated robotic tool changer comprises master and tool units, each adapted to be connected to a different one of a robotic arm and a robotic tool. The tool changer includes a plurality of rolling members retained in one of the units and a piston mounted in one of the units and moveable in an axial direction. The piston includes a multi-faceted cam surface including an initial contact surface, a locking surface, and a failsafe surface interposed between the initial contact surface and the locking surface. When the piston is in a locked position in the tool changer, the cam surface is operative to contact the rolling members in one of the units and to urge each rolling member against a surface of the other unit to couple the master and tool units together.

19 Claims, 6 Drawing Sheets

(56) References Cited

U.S. PATENT DOCUMENTS

| | | | | |
|---|---|---|---|---|
| 5,330,205 | A * | 7/1994 | Norton | 279/124 |
| 5,452,631 | A | 9/1995 | Erickson | |
| 5,533,245 | A * | 7/1996 | Stanton | 29/221.6 |
| 5,683,212 | A * | 11/1997 | Cirino et al. | 409/234 |
| 5,697,740 | A * | 12/1997 | Von Haas et al. | 409/234 |
| 5,997,011 | A * | 12/1999 | Nordquist | 279/2.09 |
| 6,196,094 | B1 * | 3/2001 | Erickson | 82/158 |
| 6,343,903 | B1 * | 2/2002 | Huang et al. | 409/231 |
| 6,398,279 | B1 * | 6/2002 | Kikut | 294/86.4 |
| 6,752,037 | B1 * | 6/2004 | Miyazawa | 74/490.01 |
| 6,824,170 | B2 * | 11/2004 | Lee | 285/92 |
| 6,840,703 | B2 * | 1/2005 | Blanchard | 403/322.2 |
| 6,884,013 | B2 * | 4/2005 | Kiviranta et al. | 411/348 |
| 7,252,453 | B1 * | 8/2007 | Little | 403/322.2 |
| 7,644,929 | B2 * | 1/2010 | Frauhammer et al. | 279/19.4 |
| 7,762,739 | B2 * | 7/2010 | Blanchard | 403/322.2 |
| 7,963,717 | B2 * | 6/2011 | Seger | 403/322.2 |
| 8,070,377 | B2 * | 12/2011 | Wang | 403/322.2 |
| 8,162,581 | B2 * | 4/2012 | Soltis et al. | 411/348 |
| 8,209,840 | B2 * | 7/2012 | Norton | 29/428 |
| 8,220,804 | B2 * | 7/2012 | Erickson et al. | 279/2.11 |
| 2007/0231063 | A1 * | 10/2007 | Tsutsumi et al. | 403/322.2 |
| 2007/0235949 | A1 | 10/2007 | Gloden et al. | |
| 2009/0110477 | A1 * | 4/2009 | Seger | 403/376 |
| 2009/0226248 | A1 * | 9/2009 | Wang | 403/322.2 |
| 2010/0054854 | A1 * | 3/2010 | Wang | 403/322.2 |

FOREIGN PATENT DOCUMENTS

| | | | | |
|---|---|---|---|---|
| EP | 0476378 | A1 | 3/1992 | |
| JP | 2004-148470 | A | 5/2004 | |
| WO | 03/101673 | A2 | 12/2003 | |
| WO | WO 2004113031 | A1 * | 12/2004 | B25J 15/04 |

* cited by examiner

MANUAL ROBOTIC TOOL CHANGER WITH ROLLING MEMBERS

FIELD OF THE INVENTION

The present invention relates generally to robotics, and in particular to a manually actuated robotic tool changer utilizing displaced rolling members as a coupling mechanism.

BACKGROUND

Robots are widely utilized in industrial assembly line and other manufacturing applications to perform repetitive tasks very precisely without the need for human operation, interaction, or supervision. For example, robots are commonly used in the automotive industry to perform a number of tasks such as material handling, cutting, welding, and the like.

To amortize the considerable cost of an industrial robot over a variety of tasks, the robot arm is typically separate from a diverse array of robotic tools, which are removably attached to the end of the robot arm. To facilitate this plurality of tools, a tool changer—comprising "master" and "tool" units—may be interposed between a robot arm and each tool that may be attached to it. The robot arm typically terminates in a master unit. A corresponding tool unit is connected to each tool that may be attached to the robot arm. A mechanical coupling mechanism in the tool changer positively locks the master and tool units together for the duration of the use of the tool on the robot arm, and releases the tool from the robot arm upon completion of the tool's tasks. In a production manufacturing environment, robotic tool changers may be power actuated, such as by electric motor, pneumatic pressure, or the like, and software controlled. The robot arm control software then swaps out tools as necessary, reducing down time.

However, in many applications, such as where robotic tasks change only infrequently, or where tools are changed only in the event of a tool failure, or where there is no way to provide air or power for tool changer operation, a manually actuated tool changer may be simpler, more reliable, and less expensive than an automated one. A manual tool changer should be simple to operate, and should include safety features that prevent unintentional decoupling of the master and tool units.

SUMMARY

A manually actuated robotic tool changer comprises master and tool units, each adapted to be connected to a different one of a robotic arm and a robotic tool. The tool changer includes a plurality of rolling members retained in one of the units and a piston mounted in one of the units and moveable in an axial direction. The piston includes a multi-faceted cam surface including an initial contact surface, a locking surface, and a failsafe surface interposed between the initial contact surface and the locking surface. When the piston is in a locked position in the tool changer, the cam surface is operative to contact the rolling members in one of the units and to urge each rolling member against a surface of the other unit to couple the master and tool units together.

DETAILED DESCRIPTION

Figure 1:
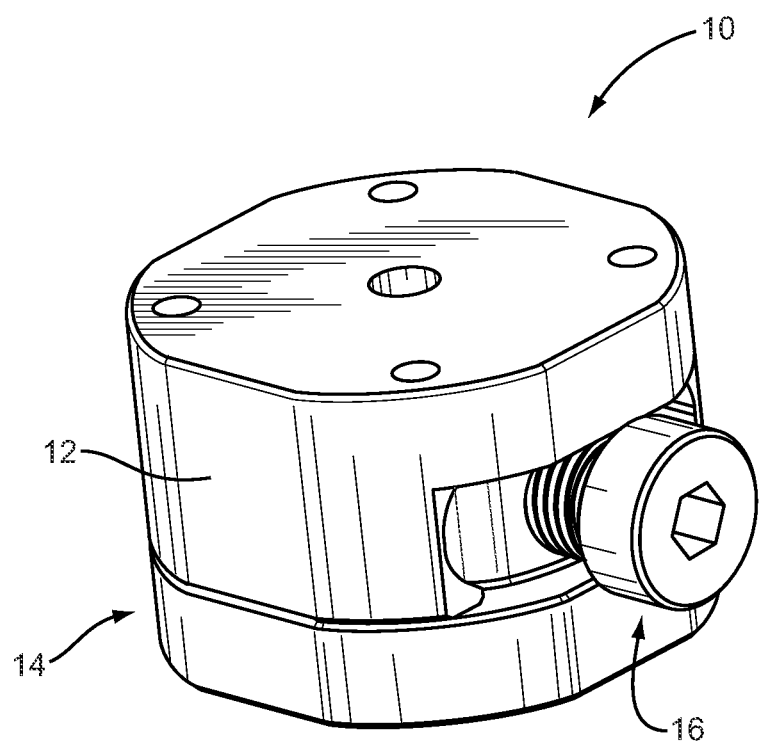
FIG. 1 is a perspective view of a manually actuated robotic tool changer.

FIG. 1 depicts a manually actuated robotic tool changer 10 in a coupled state. The tool changer 10 comprises a tool unit 12 adapted to be connected to a robotic tool, and a master unit 14 adapted to be connected to a robotic arm. A piston 16 is movably mounted within the master unit 14, and depicted in FIG. 1 in a locked position.

Figure 2:
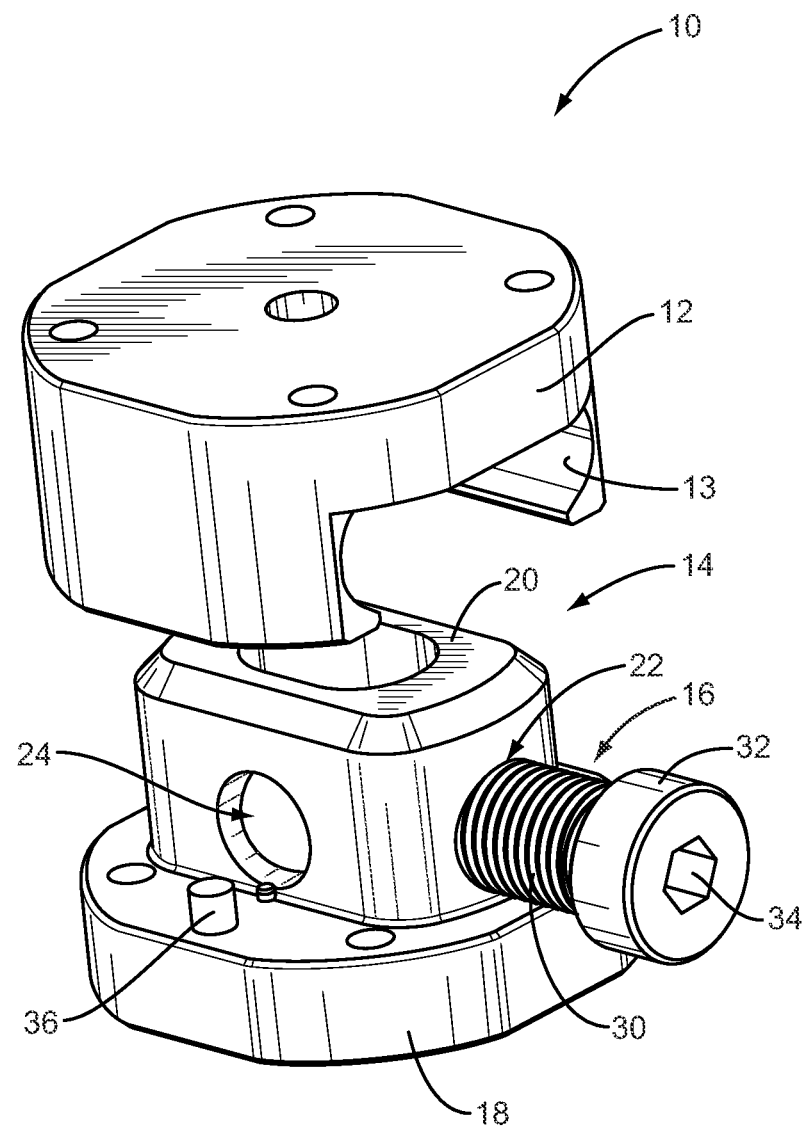
FIG. 2 is a perspective view of the master and tool units that make up the manually actuated robotic tool changer.

FIG. 2 depicts the robotic tool changer 10 in a decoupled state, with the piston 16 in an unlocked position and the tool unit 12 separated from the master unit 14. The master unit 14 comprises a base plate 18 and a housing 20 connected to the base plate 18. The piston 16 is mounted in the housing 20 via a threaded shaft 30 that mates with a correspondingly tapped bore 22. By rotating the piston 16 about its axis—either by hand, gripping the head 32, or by use of a tool such as a hex wrench inserted into opening 34—the piston 16 moves linearly along its axis with respect to the housing 20 by action of the threads 30 and tapped bore 22. The housing 20 additionally includes one or more openings 24, through which rolling members (not depicted in FIG. 2) partially protrude when the piston 16 is in a locked position, to couple the tool unit 12 to the master unit 14. This coupling occurs as the rolling members are pressed against a ledge 13 in the tool unit 12. One or more alignment members 36 on the base plate 18 are received by corresponding alignment member voids (not depicted in FIG. 2) in the tool unit 12, to ensure alignment between the master and tool units 14, 12.

Figure 3:
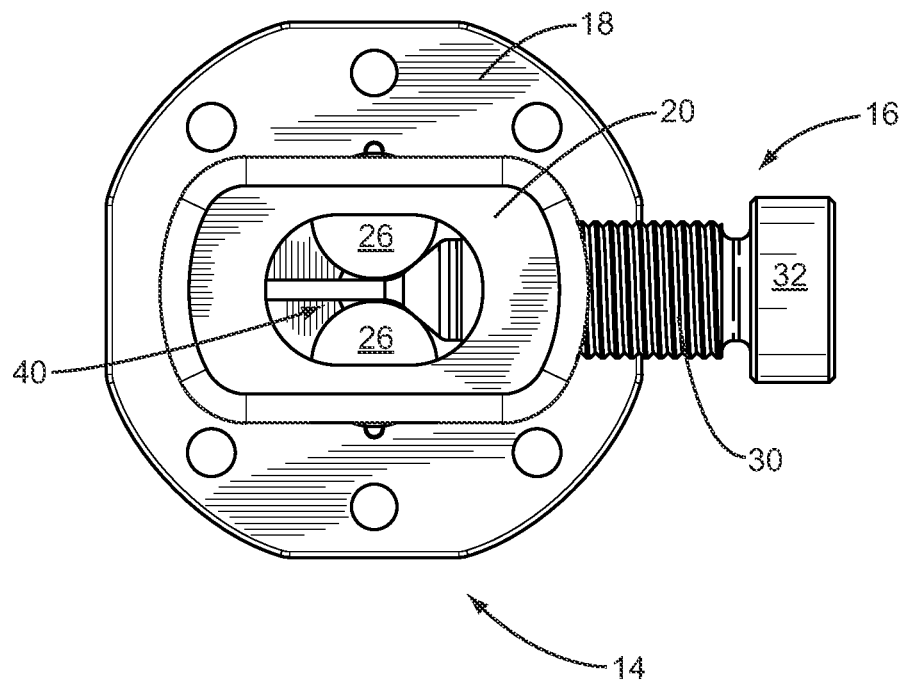
FIG. 3 is a plan view of the master unit of the manually actuated robotic tool changer, with the piston in the unlocked position.

FIG. 3 depicts the master unit 14 with the piston 16 in an unlocked position, and rolling members 26—in this embodiment, spheres—retracted into the housing 20. In other embodiments, the rolling members 26 may comprise cylinders or other shapes capable of rolling. In the unlocked position, the tool unit 12 may freely move onto or off of the master unit 14.

Figure 4:
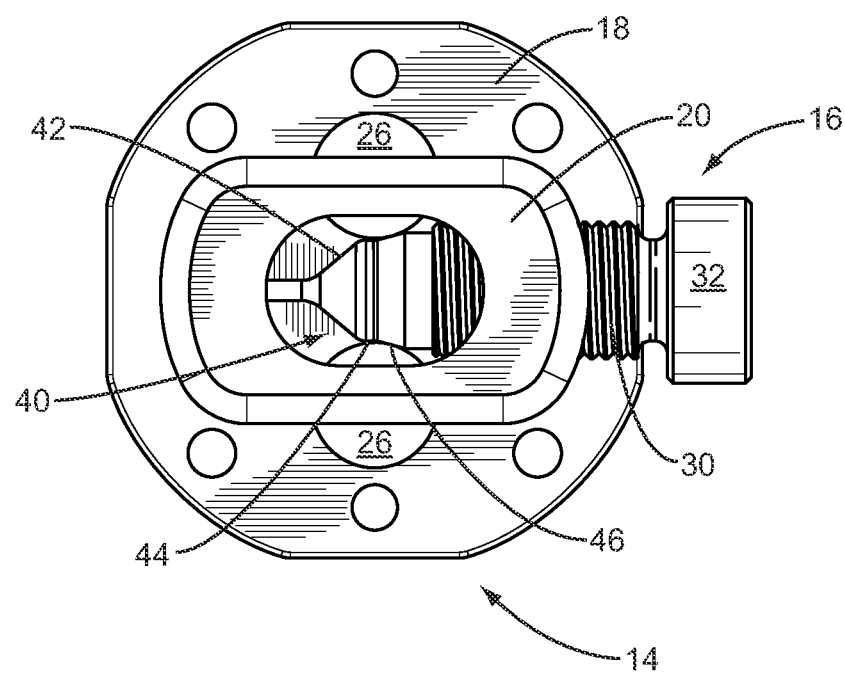
FIG. 4 is a plan view of the master unit of the manually actuated robotic tool changer, with the piston in the locked position.

FIG. 4 depicts the master unit 14 with the piston 16 in a locked position, and rolling members 26 partially protruding from the openings 24 in the sides of the housing 20. The rolling members 26 are urged outwardly through the openings 24 by a multi-faceted cam surface 40 as the piston 16 advances from an unlocked to a locked position (to the left, as depicted in FIGS. 3 and 4). The openings 24, at the least the outermost surface thereof, are preferably sized slightly less than the diameter of the rolling members 26, so as to retain the rolling members 26 within the housing 20. In one embodiment, the openings 24 are concave, matching the curvature of the rolling members 24. As each rolling member 24 advances outwardly of the housing 20, it contacts, and is pressed against, a ledge 13 in the tool unit 12 (best seen in FIG. 2), which couples the tool unit 12 to the master unit 14.

Figure 5:
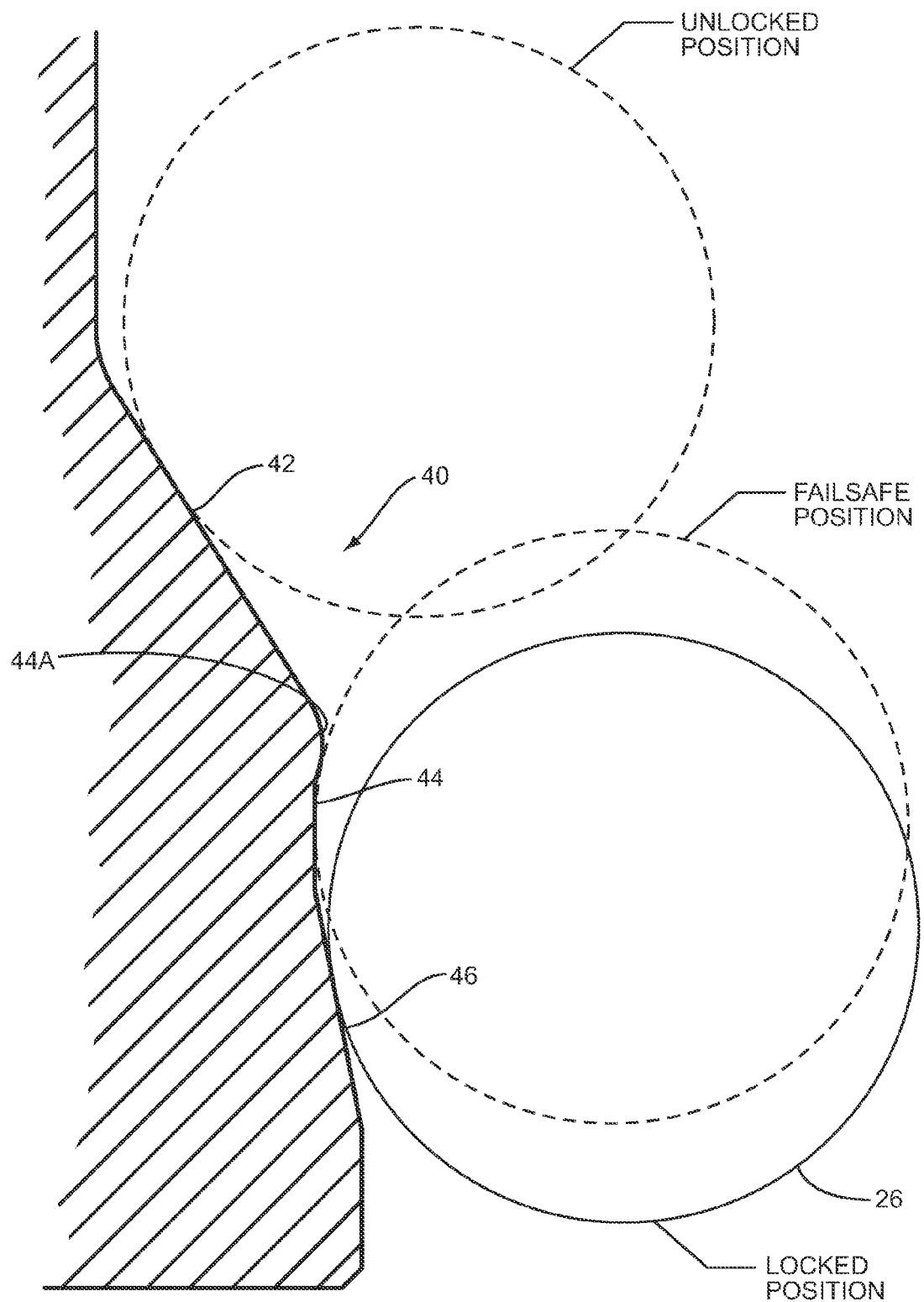
FIG. 5 is an enlarged section view of a multi-faceted cam surface.

FIG. 5 depicts details of the multi-faceted cam surface 40, and its interaction with the rolling members 26. As the piston 16 moves from the unlocked position (see FIG. 3) toward the locked position (see FIG. 4), an initial contact surface 42 contacts the rolling members 26. The initial contact surface 42 is conical, or inclined with respect to the axis of the piston 16, in a direction that urges the rolling members 26 radially outward (and out of the housing 20) as the piston 16 advances toward the locked position. At the other end of the multi-faceted cam surface 40, a locking surface 46 presses the rolling members 26 firmly against the ledge 13 in the tool unit 12 to couple the tool unit 12 to the master unit 14, when the piston is in the locked position. The locking surface 46 is conical, and is inclined in the same direction, with respect to the axis of the piston 16, as the initial contact surface 42, although it may have a different angle of inclination. Note that although, for ease of explanation, FIG. 5 appears to depict one cam surface 40 and three different rolling member 26 positions, in fact the rolling members 26 are fixed against movement in the axial direction of the piston. FIG. 5 thus actually depicts relative positions of the cam surface 40 (and the radial position of the rolling members 26) as the piston 16 moves between various positions.

Interposed between the initial contact surface 42 and the locking surface 46 is a failsafe surface 44. Accordingly, when the piston is positioned such that the rolling members 26 contact the failsafe surface, it is said to be a failsafe position. The failsafe position of the piston 16 is in between the locked and unlocked positions, and, as explained below, is very close to the locked position. The failsafe surface 44 is not inclined with respect to the axis of the piston 16 in the same direction as the initial contact surface 42 and the locking surface 46. In one embodiment, the failsafe surface 44 is cylindrical about the axis of the piston 16. That is, the failsafe surface 44 is parallel to the axis, and not inclined with respect to the axis in either direction. The purpose of the failsafe surface 44 is to prevent inadvertent decoupling of the tool changer 10.

When the piston 16 is in the locked position, the locking surface 46 exerts a radial, outward force on each rolling member 26, which may be represented by a force vector normal to the locking surface 46. Conversely, each rolling member 26 exerts an inwardly-directed radial force on the piston 16, also in a direction normal to the locking surface 46. Because the locking surface 46 is inclined with respect to the axis of the piston 16, a component of this inward radial force acts along the axis of the piston 16, urging the piston 16 toward the unlocked position (i.e., down, as depicted in FIG. 5). If the piston 16 is not fixed in the locked position, movement and vibration of the tool changer 10 may allow this force component to cause the piston 16 to rotate, and move towards the unlocked position. This would reduce the force with which the rolling members 26 are urged against the ledge 13 in the tool unit 12, introducing undesirable "play," or relative movement between the tool unit 12 and the master unit 14. Ultimately, the force may urge the piston 16 so far toward the unlocked position as to allow the tool unit 12 to separate from the master unit 14—an unacceptable safety hazard.

The failsafe surface 44, interposed between the locking surface 46 and the initial contact surface 42, is not inclined with respect to the axis of the piston 16 in the same direction as the other two surfaces. In one embodiment, the failsafe surface 44 is cylindrical, or parallel to the axis of the piston 16. As in the piston 16 moves to the failsafe position, the rolling members 26 contact the failsafe surface 44 rather than the locked surface 46. In this position, the force exerted by each rolling member 26 against the piston 16 is normal to the failsafe surface 44. Since the failsafe surface 44 is parallel to the axis of the piston 16, the inward radial force cannot urge the piston 16 in either direction along its axis. Accordingly, the tool unit 12 will remain coupled to the master unit 14 until the piston is manually actuated to the unlocked position.

Figure 6:
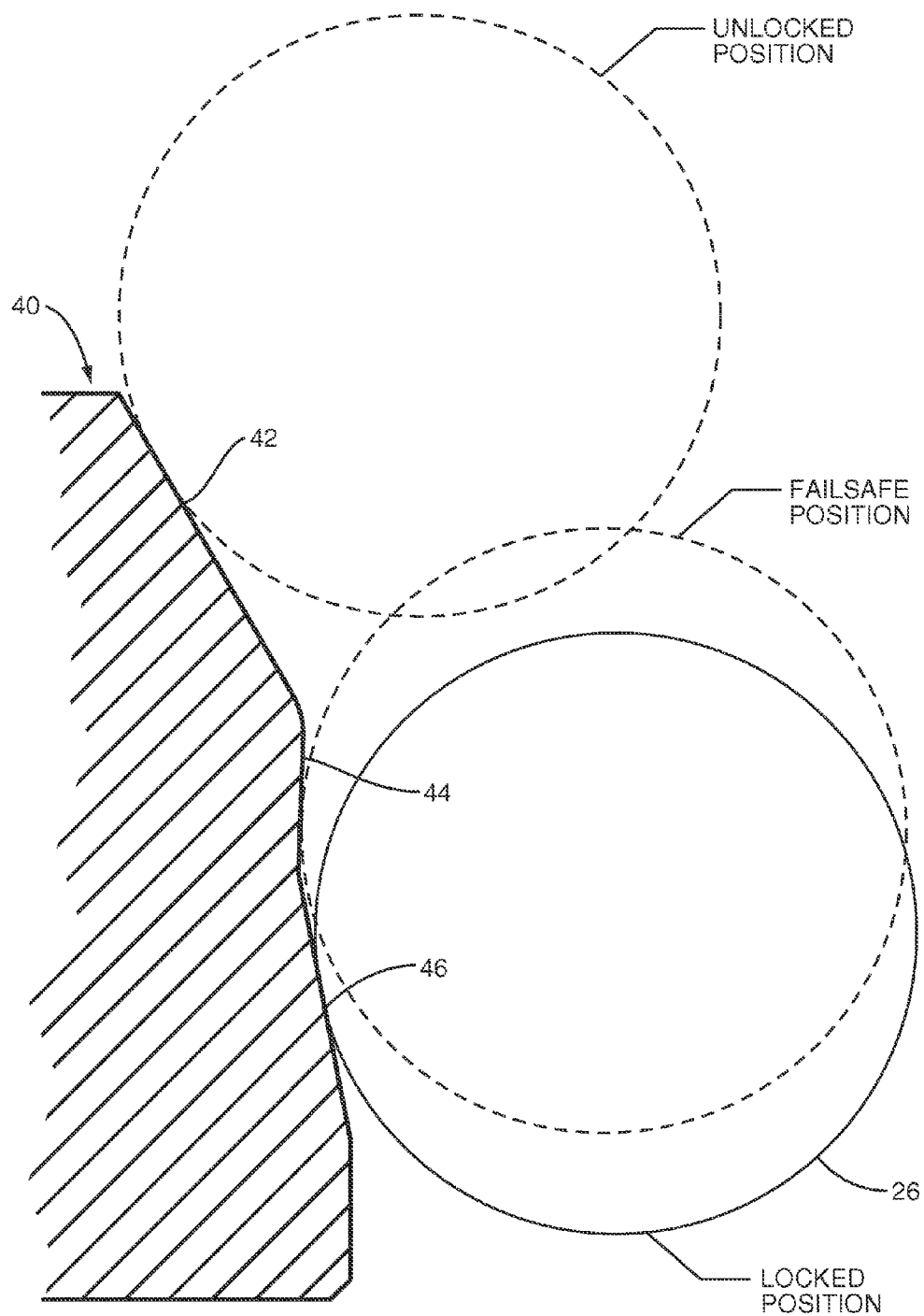
FIG. 6 is an enlarged section view of a multi-faceted cam surface featuring a reverse angled failsafe surface.

In one embodiment, the failsafe surface 44 includes a ridge, or retarding surface 44A, disposed opposite the locking surface 46—that is, adjacent the initial contact surface 42. The retarding surface 44A further secures the piston 16 in the failsafe position. To clear the retarding surface 44A, the rolling members 26 must move slightly outwardly, requiring a positive actuation of the piston 16 to move it further toward the unlocked position. In one embodiment, depicted in FIG. 6, the failsafe surface 44 may comprise a conical surface, slightly inclined with respect to the axis of the piston 16, but in a direction opposite to the inclination of the initial contact surface 42 and locking surface 46. In all of these embodiments, the failsafe surface 44 is preferably disposed adjacent a relatively short locking surface 46, as compared to the initial contact surface 42—in other words, the failsafe position of the piston 16 is preferably close to the locked position—so that rolling members 26 retract only slightly within the housing 20 from their place in the locked position.

Figure 7:
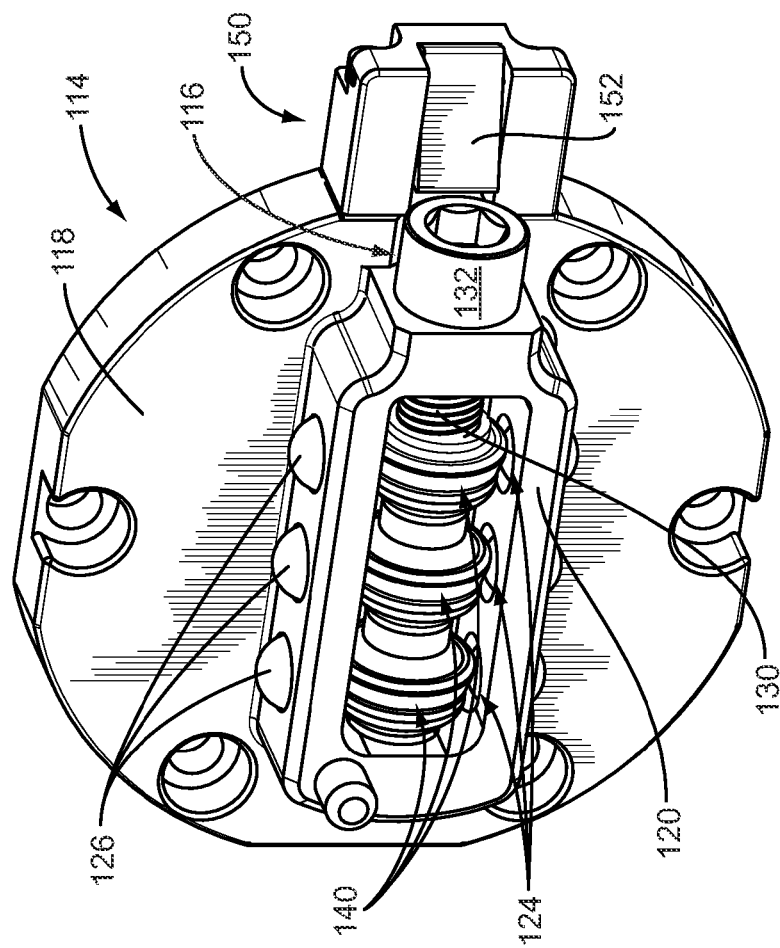
FIG. 7 is a perspective view of the master and tool units of a manually actuated robotic tool changer having plural rolling members and a piston with plural cam surfaces.
Figure 7:
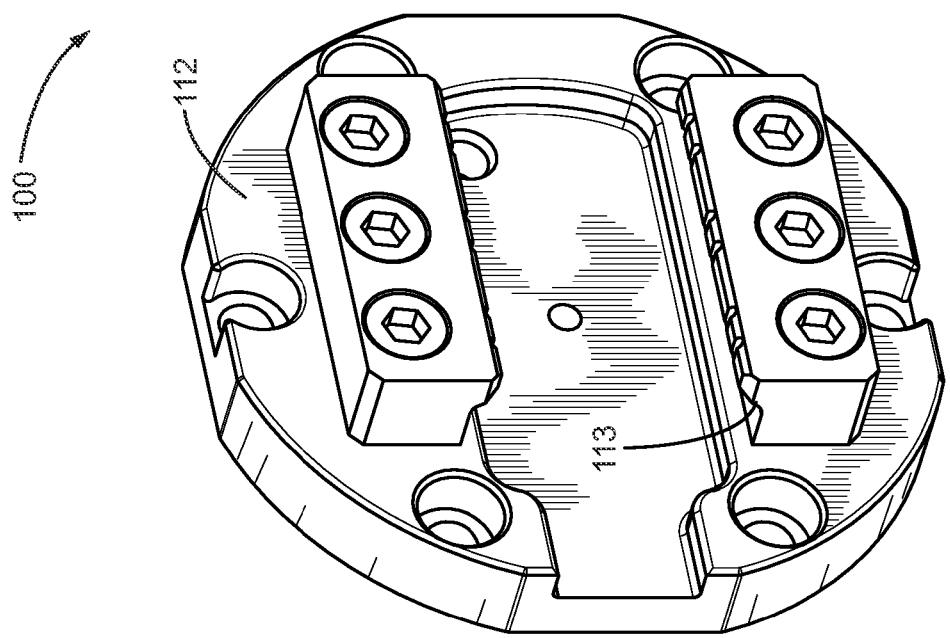

The manually actuated tool changer of the present invention is scalable. FIG. 7 depicts an embodiment of the tool changer 100 for coupling a robot arm to a larger and/or heavier robotic tool then the tool changer 10 of FIGS. 1-4. The tool changer 100 comprises a tool unit 112 and a master unit 114. The master unit 114 includes a base plate 118, and a housing 120. A piston 116 is movably mounted within the housing 120, and movable in an axial direction via threads 130. A plurality (three, in the embodiment depicted) of multi-faceted cam surfaces 140 on the piston 116 engage with a corresponding plurality of rolling members 126. The rolling members 126 are forced to extend partially out of the housing 120 through corresponding openings 124, as the piston 116 moves from an unlocked position to the locked position depicted in FIG. 7. In the locked position, the rolling members 126 engage and press against ledges 113, locking the tool unit 112 to the master unit 114. Each of the multi-faceted cam surfaces 140 comprises an initial contact surface 142, a failsafe surface 144, and a locking surface 146, as discussed above with reference to FIGS. 5 and 6.

The tool changer 100 of FIG. 7 further includes a locking mechanism 150 to prevent the piston 116 from inadvertently "backing out" from the locked position. A spring-loaded latch 152 is depressed into the housing of the locking mechanism 150 as the piston 116 advances from an unlocked position to the locked position. With the piston 116 in the locked position, the latch 152 is released, and raises adjacent the head 132. In this position, the latch 152 blocks the piston 116 from further movement towards the unlocked position (i.e., to the right, as depicted in FIG. 7).

Service transfer modules (not shown) may be attached to the tool units 12, 112 and master units 14, 114, such that the service transfer modules mate when the master and tool units 14, 114, 12, 112 are coupled together, to provide for the transfer of utilities such as electricity, data signals, pneumatics, fluid, and the like. Although not depicted in the drawings, the master and tool units 14, 114, 12, 112 may alternatively or additionally include service transfer facilities within their respective housings. For example, U.S. Pat. No. 5,211,501 to Nakamura, et al., incorporated herein by reference, depicts a robotic tool coupler having an integral pneumatic fluid transfer facility.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A manually actuated robotic tool changer, comprising:
   a first unit adapted to be connected to one of a robotic arm or a robotic tool;
   a second unit adapted to be connected to the other of the robotic arm or the robotic tool;
   a plurality of rolling members retained in one of the units;
   a piston mounted in one of the units, the piston moveable along its axis between unlocked and locked positions under manual actuation, the piston having a multifaceted cam surface including an initial contact surface, a locking surface, and a failsafe surface interposed between the initial contact surface and the locking surface;
   wherein, when the piston is in the locked position, the cam surface is operative to contact the rolling members in one of the units and to urge each rolling member against a surface of the other unit to couple the two units together.

2. The tool changer of claim 1 wherein the piston includes a threaded portion, and wherein it is mounted in one of the units through a correspondingly tapped hole.

3. The tool changer of claim 1 wherein the initial contact surface and the locking surface are conical, and inclined with respect to the axis of the piston so as to urge the rolling members radially outward as the piston advances from the unlocked position to the locked position.

4. The tool changer of claim 3 wherein the failsafe surface is not inclined with respect to the axis of the piston in the same direction as the initial contact surface and the locking surface.

5. The tool changer of claim 4 wherein the failsafe surface is cylindrical about the axis of the piston.

6. The tool changer of claim 5 wherein the piston may assume a failsafe position between the locked and unlocked positions wherein the rolling members contact the failsafe surface and wherein the failsafe surface includes a retarding surface thereon operative to at least partially resist the movement of the piston from the failsafe position towards the unlocked position.

7. The tool changer of claim 6 wherein the retarding surface comprises a ridge disposed adjacent the contact surface.

8. The tool changer of claim 4 wherein the failsafe surface is inclined with respect to the axis of the piston in the opposite direction as the initial contact surface and the locking surface.

9. The tool changer of claim 1 wherein the piston comprises a plurality of multi-faceted cam surfaces, each operative to urge a corresponding plurality of rolling members against a surface to couple the first and second units together.

10. The tool changer of claim 1 further comprising a locking mechanism operative to maintain the piston in the locked position.

11. The tool changer of claim 10 wherein the locking mechanism includes a spring-loaded latch operative to physically block the piston from movement towards the unlocked position.

12. A piston for a manually actuated robotic tool changer comprising two units and including a plurality of rolling members retained in one of the units and a rolling member contact surface on the other unit, the piston comprising:
    a threaded portion; and
    one or more multi-faceted cam surfaces, each comprising
        an initial contact surface operative to contact the rolling members and urge them radially outward as the piston moves axially in a first direction, under manual actuation, in the tool changer;
        a locking surface operative to press the rolling members against the rolling member contact surface; and
        a failsafe surface interposed between the initial contact surface and the locking surface, the failsafe surface operative to retard movement of the piston in a second axial direction opposite the first direction.

13. The piston of claim 12 wherein the initial contact surface and the locking surface are conical, and inclined with respect to the axis of the piston so as to urge the rolling members radially outward as the piston moves in the first axial direction.

14. The piston of claim 13 wherein the failsafe surface is not inclined with respect to the axis of the piston in the same direction as the initial contact surface and the locking surface.

15. The piston of claim 14 wherein the failsafe surface is cylindrical about the axis of the piston.

16. The piston of claim 15 wherein the failsafe surface includes a retarding surface thereon operative to at least partially resist the movement of the piston in the second axial direction.

17. The piston of claim 16 wherein the retarding surface comprises a ridge disposed adjacent the contact surface.

18. The piston of claim 14 wherein the failsafe surface is inclined with respect to the axis of the piston in the opposite direction as the initial contact surface and the locking surface.

19. The piston of claim 12 further comprising a plurality of multi-faceted cam surfaces.

* * * * *